United States Patent Office 2,760,568
Patented Aug. 28, 1956

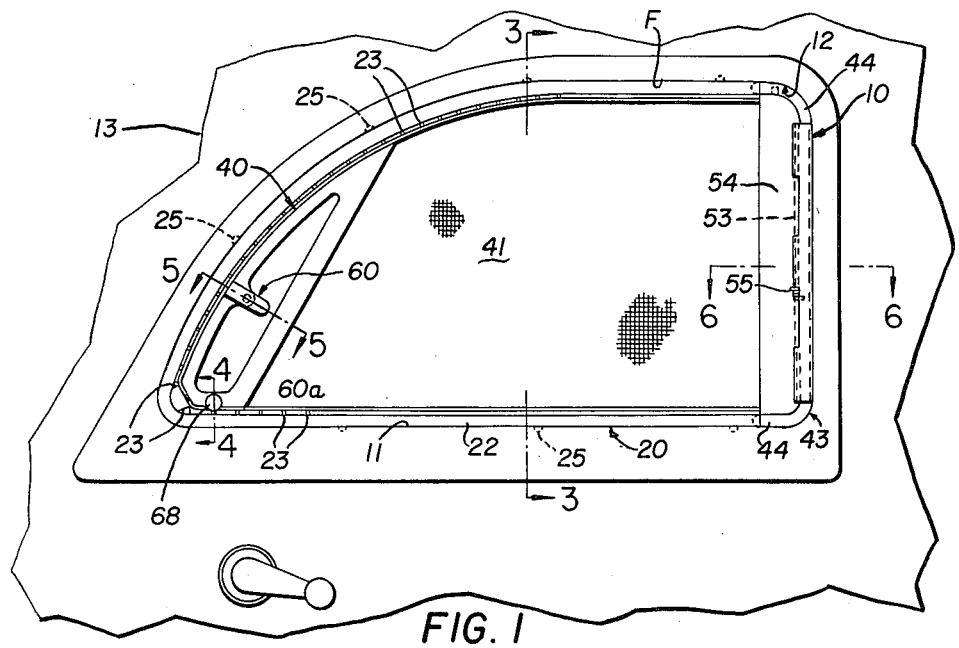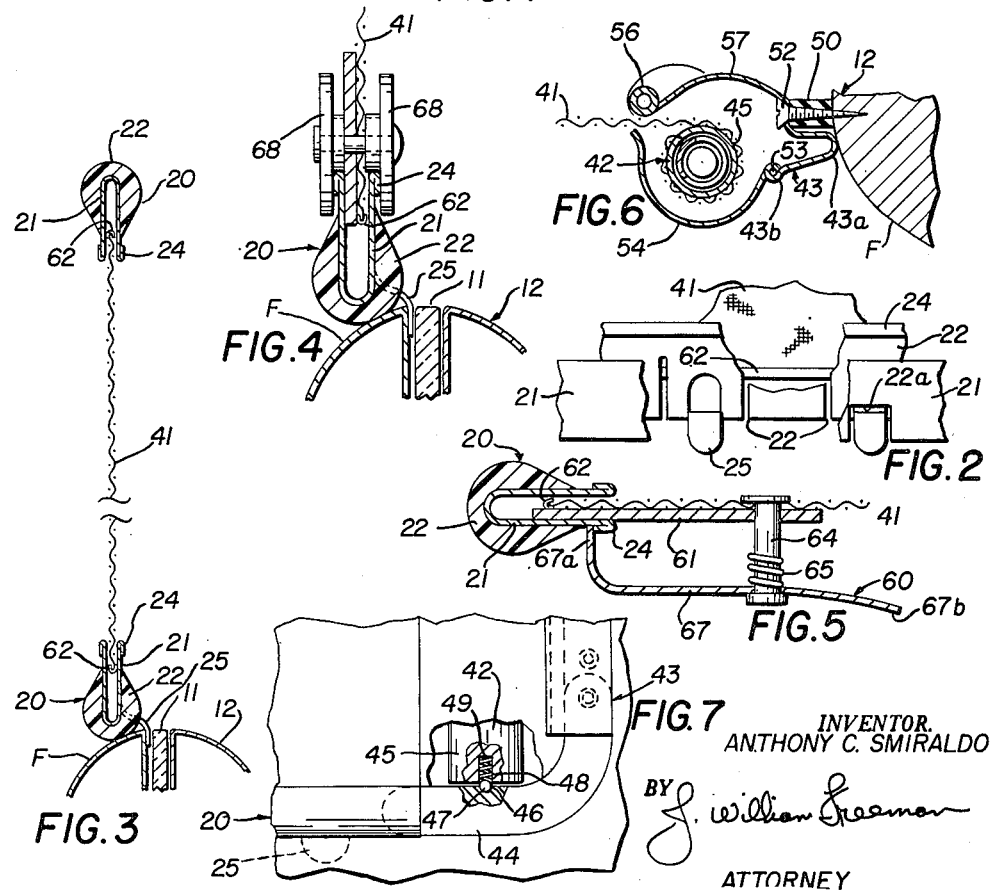
INVENTOR.
ANTHONY C. SMIRALDO

2,760,568

ADJUSTABLE CAR SCREEN

Anthony C. Smiraldo, Cuyahoga Falls, Ohio

Application August 12, 1955, Serial No. 528,208

5 Claims. (Cl. 160—372)

This invention relates to screens, and in particular, relates to retractible screens having particular utility in automobiles.

In the past, several types of screens have been proposed for use in connection with conventional window openings of an automobile. Certain of these screens have been merely capable of being positioned interiorly of the window openings to close off the same, while others have contemplated certain prebuilt and preformed structural frame members that would accommodate a retractible screen member that covered at least a portion of the window opening. In general, all of the known prior art types of car screens have been characterized by their inability to be interchangeable between various automobiles, due to the varying outline configurations of the window openings of various models of automobiles. It has also been cumbersome in the past to provide prebuilt units for an individual window opening of a particular model of automobile, in view of the fact that the same provided a storage problem when not in use, because of their relative bulk.

It has also been attempted in the prior art to employ roll-type screens in automobiles. Such attempts have heretofore been unsuccessful because of the impossibility of fitting the rolled screen member with respect to the outline of the car window opening.

In my co-pending application Serial No. 429,430, filed May 13, 1954, there was disclosed an improved type of roll screen, capable of use in a plurality of window openings, without modification of the basic screen unit per se. In essence, this improved type of car screen contemplated the use of spring loaded frame members that were designed to be longitudinally adjustable so as to permit their reception in various sizes and shapes of automobile windows. These adjustable frame members, when coupled with an adjustable interconnecting piece, were capable of being received in the vast majority of automobiles.

While the above described improved type of car screen has been found to be satisfactory generally, it has been found that the overall efficiency and desirability of such units can be greatly improved by modifying the structure of the frame member, so as to make the same of a continuous length of material capable of being formed to the required contour necessary to permit installation of the same in varying sizes and shapes of window openings.

It accordingly becomes one object of this invention to provide a window screen unit that will be adaptable to screen a plurality of car window openings of varying configuration.

It is a further object of this invention to provide a car screen of the type above described that is characterized by the use of a retractible roll screen that permits self storage of the screen when the same is not in use.

These and other objects of the invention will become more apparent upon a reading of the following brief specification, considered and interpreted in the light of the accompanying drawings.

Of the drawings:

Figure 1 is a side elevation viewing the improved car screen from the inside of an automobile upon which the same has been mounted.

Figure 2 is a progressive break-away view illustrating the component parts of the frame portion of the car screen after installation.

Figures 3, 4, 5 and 6 are sectional views taken respectively on the lines 3—3, 4—4, 5—5 and 6—6 of Figure 1.

Figure 7 is an enlarged elevation showing the juncture between the adjustable frame member and the retractible screen member.

Referring now to the drawings, and in particular to Figure 1 thereof, the car screen unit, generally designated by the numeral 10, is shown positioned interiorly of the conventional window glass 11 that is operable in known manner within the window opening 12 of an automobile 13.

As can best be seen from the drawings, the car screen 10 per se includes in general an adjustable frame member 20, having operably received therein a retractible screen unit designated as 40; the arrangement being such that the screen member 40 can be selectively opened and closed when the frame member 20 is positioned as shown in Figure 1 of the drawings.

To the end of effectuating such positioning of the frame member 20 as just described, the same (frame member 20) is shown as being defined by a U-shaped channel 21 of elongated length, which has the exterior surface thereof surrounded by an elongated bumper member 22 that is tear-shaped in cross-sectional configuration, to thus facilitate flush mounting of the same against the frame portion F of the window opening 12. While the drawings have been sectioned to illustrate the bumper member 22 as being of plastic composition, it is to be understood that other types of resilient material could be employed, so long as the principal requirement of inherent flexibility is present to thus permit the same to be formed to the requisite arcuate shape upon subsequent installation.

For the purpose of forming the channel 21 in similar manner so that the same can flex with the surrounding bumper member 22, the same (channel 21) is shown formed with a series of vertically extending slots 23, 23 that extend along the longitudinal length thereof. In this manner, the beaded edge 24 of channel 21 can be bent to the required contour, with the result that the frame unit 20, as defined by channel 21 and bumper member 22, can easily be flexed to the required contour upon installation. As a result of such inherent properties, it is manifest that the frame 20 can be supplied in straight elongated strip form for subsequent installation in an automobile.

In addition to the aforementioned component parts, the frame 20 further includes a plurality of tab members 25, 25 that are shown as being struck out of channel 21 so as to be engageable over the window opening 12 between the window 11 and frame F, with clearance undercuts 22a, 22a (see Figure 2) being provided in the bumper member 22 for this purpose.

Turning now to a consideration of the retractible screen member 40 per se, it will be seen from Figures 4, 5, 6 and 7 of the drawings that the same includes a flat screen 41 that is rolled about a windup mechanism 42 so that the leading edge structure thereof may be clamped against the arcuate end of frame 20 to thus fully screen the window opening 12, in a manner to be described.

Considering first the structure of the windup mechanism 42, it will be seen that the same includes a U-shaped bracket 43 that is formed with transversely extending leg portions 44, 44 which receive the opposed axial ends of a roller 45, upon which the screen 41 is fastened.

While not shown in detail, it is to be understood that the roller 45 includes windup means of known type, whereby a continuous rotational force is exerted, tending to roll the screen 41 about roller 45.

As best shown in Figure 7 of the drawings, the legs 44, 44 are provided with undercuts 46, 46 which are intended to receive balls 47, 47 that are provided in each axial end of the roller 45. These balls 47, 47 are shown as being spring loaded by springs 48, 48 which are seated in openings 49, 49. In this manner, the roller 45 is rotatably retained with respect to the bracket 43, while the removal thereof may be easily facilitated by release of the balls 47, 47 from the undercuts 46, 46 on legs 44, 44.

To the end of attaching the bracket member 43 with respect to the rear frame portion of the window opening 12, there is shown provided a resilient block 50 that acts as a spacer to space the flange 43a of bracket 43 with respect to frame F as best shown in Figure 6, with screw 52 serving to retain the bracket 43 in the position shown.

By like token, the opposed free end 43b of bracket 43 is shown defining a hinge point 53, about which swings a cover plate 54, with spring 55 (see Figure 1) serving to normally retain the cover member 54 in the closed position of Figure 6.

In addition to the action of the roller 45 which has been previously described as being tensionally urged to rotational movement, there is provided a second back-up roller 56 that is rotatably mounted on rear cover member 57 of bracket 43 so as to exert a smoothing action upon the screen 41 when the same is wound up.

Because the roller 45 has been indicated as exercising a constant windup force on the extended screen 41, the leading edge of the screen 41 is provided with a clamping mechanism 60 that secures the leading edge of the screen 41 with respect to the forwardly presented portion of the frame member 20. In view of the salient fact that the car screen unit 40 is custom built to fit the particular model upon which the same will be used, it is manifest that the configuration of the clamping mechanism 60 will vary in accordance with the shape of the car window opening with which the same is being used. However, it is to be understood that this clamping mechanism 60 will, in every case, cooperate with a standard frame member 20 of the type above described.

Accordingly, the clamping member 60 includes a stiffener 61 of appropriate contour, that is secured on the leading edge of the car screen 41 so as to be received interiorly of the channel 21, as best shown in Figure 5 of the drawings. A supporting frame member 62 is shown provided rearwardly of the stiffener 61 for the purpose of adding rigidity to the overall leading edge structure 43. As best shown in Figure 5 of the drawings, the stiffener 61 further includes a pin 64 that is spring loaded by spring 65 so as to tensionally urge a hook member 67 into clamping contact with the beaded edge 24 of channel 21. Additionally, the frame member 60a which connects stiffener 61 and frame member 62 is shown provided with a pair of roller members 68, 68; the arrangement being such that these roller members 68, 68 contact the beaded edge portion 24 to insure the uniform movement of the screen member 41 across the frame member 20 when the same is being retracted (see Figure 4).

In use or operation of the improved car screen 10, it will first be assumed that the adjustable frame member has been provided to the owner in the elongated strip form previously referred to. At this time, the owner may position the car screen unit 10 with respect to the window opening 12 by merely securing the U-shaped bracket 43 with respect to the rear frame portion of the window opening 12 by use of screws 52, 52 which are applied through resilient blocks 50, 50 as previously described. At this time, one longitudinal end of the frame 20 may be abutted against the lower projecting leg 44 of bracket 43, for example, and the frame member 20 may be progressively positioned with respect to the window opening 12 by inserting successive tab members 25, 25 in the space that exists between the window 11 and the car frame F, as best shown in Figure 4 of the drawings.

When the front edge of the automobile window opening 12 has been reached, it is apparent that the frame member 20 will have to be bent; and at such time the contour of the frame member 20 may be adjusted by merely applying manual pressure so as to open the space existing between the adjacent slots 23, 23 of the channel member 21, with the resilient bumper 22 being deformed at the same time. It is apparent that after such deformation the appropriate tabs 25, 25 may be positioned between the frame F and window 11, as previously indicated, until such time as the arcuate contour has been completed. When the arcuate portion of the window frame 12 has been installed and the top horizontal surface is encountered, the tabs 25, 25 may be continued to be positioned between the frame F and the window 11 until such time as the upper end portion 44 of bracket 43 is approached. At this time, the length of the frame member 20 may be trimmed by cutting the same off, for example, with a pair of shears or scissors so that the longitudinal end of the frame member 20 will exactly abut with the upper leg end 44 of bracket 43 (see Figure 1). At this time, the adjustable frame has been firmly and fixedly positioned with respect to the window opening 12 and the retractible car screen unit 40 may now be positioned by merely snapping the ball members 47, 47 of roller 45 into position with respect to the appropriate undercuts 46, 46 that are provided on leg extensions 44, 44. To facilitate such insertion of the roller 45, it is believed apparent that the cover 54 can be pivoted backwards about hinge 53 to provide access. With the retractible screen unit 40 thus positioned, the device is now ready for operation.

During such operation, it is apparent that when the retractible screen unit 40 is moved to the left of Figure 1 towards the full line position thereof, that the rollers 68, 68 will ride on the beaded edge portions 24, 24 of channel 21, with the result that such movement of screen 41 will be accordingly guided. As the condition of closure is approached, it is apparent that the hook end 67a of hook member 67 will be forced outwardly so as to snap over the beaded edge portion 24 of channel 21, with spring 65 holding the same in this position. When it is desired to open the screen for any reason whatsoever, it is merely necessary that the handle end 67b of hook member 67 be depressed, at which time the screen will move to the right due to the retracting force offered by the tensionally wound roller member 43.

It will be seen from the foregoing that there has been provided a new and novel type of car screen unit that is characterized by extreme simplicity of operation and ease of use. It has been further shown how the device is of simple construction that is capable of utilization without interfering with the raising or lowering of the conventional window glass of an automobile. It is additionally believed apparent that the feature of providing an adjustable frame member in elongated strip form adds greatly to the overall compactness of the device and accordingly renders the same more desirable from a marketing standpoint. In this regard, applicant's novel frame can be used on a plurality of different models of cars, and it is only necessary to supply a custom made screen for the particular car involved. It is believed apparent that such a desirable feature of providing an interchangeable frame for use with a custom made screen greatly enhances the marketing aspects of the invention.

While the foregoing disclosure has been specific with regard to the configuration and composition of certain component parts, it is to be understood that such specific recitation has been entered into only for the purpose of making a full and complete disclosure of the invention.

It accordingly follows that modifications such as change in configuration and composition, could be resorted to without departing from the spirit thereof or the scope of the appended claims.

This application is a continuation in part of co-pending application Serial No. 429,430, filed May 13, 1954.

What is claimed is:

1. A screen unit for automobile window openings, comprising; an elongated guide track having transverse slots opening to one longitudinal edge portion thereof, whereby the same may be formed to various configurations; an elongated resilient strip surrounding the exposed exterior surface of said guide track and being deformable therewith; a roll screen; means for securing the opposed axial ends of said roll screen to said window frame in adjacency with the longitudinal ends of said deformed guide track and said resilient strip adhered thereto, whereby the edges of said screen will be received in said guide track upon withdrawal thereof; a formed frame secured to the leading edge of said screen; and means for securing said frame to said guide track when said screen is withdrawn.

2. A screen unit for automobile window openings, comprising; an elongated guide track having transverse slots opening to one longitudinal edge portion thereof, whereby the same may be formed to various configurations; an elongated resilient strip surrounding the exposed exterior surface of said guide track and being deformable therewith; a roll screen; means for securing the opposed axial ends of said roll screen to said window frame in adjacency with the longitudinal ends of said deformed guide track and said resilient strip adhered thereto, whereby the edges of said screen will be received in said guide track upon withdrawal thereof; a formed frame secured to the leading edge of said screen; means for securing said frame to said guide track when said screen is withdrawn; and means for securing said guide track to said window frame.

3. A screen unit for automobile window openings, comprising; an elongated guide track having transverse slots opening to one longitudinal edge portion thereof, whereby the same may be formed to various configurations; an elongated resilient strip surrounding the exposed exterior surface of said guide track and being deformable therewith; a roll screen; means for securing the opposed axial ends of said roll screen to said window frame in adjacency with the longitudinal ends of said deformed guide track and said resilient strip adhered thereto, whereby the edges of said screen will be received in said guide track upon withdrawal thereof; a formed frame secured to the leading edge of said screen; means for securing said frame to said guide track when said screen is withdrawn; and means for securing said guide track to said window frame; said last-mentioned means for securing said guide track to said window, including tabs projecting outwardly from said guide track and said resilient strip for reception between said frame and said window thereof.

4. The device of claim 1 further characterized by the fact that said guide track and said resilient strip are both of U-shaped configuration.

5. A screen unit for automobile window openings, comprising; an adjustable frame member and a roll screen operably associated therewith; said adjustable frame member including an elongated base member capable of being deformed and having a longitudinally extending guide track therein; a resilient bumper, surrounding the exterior surface of said base member for contact with the frame portion of said window opening and means for securing said adjustable frame member with respect to said window opening; said roll screen including edge portions of said screen receivable in said guide track; and a rigid leading edge portion; means for securing said rigid leading edge portion with respect to said frame.

References Cited in the file of this patent

UNITED STATES PATENTS

| | | |
|---|---|---|
| 1,210,012 | Snell | Dec. 26, 1916 |
| 1,823,290 | Prawalsky | Sept. 15, 1931 |
| 2,092,914 | Greist | Sept. 14, 1937 |
| 2,528,848 | Weinzimmer | Nov. 7, 1950 |
| 2,702,596 | Morrow | Feb. 22, 1955 |